United States Patent [19]
d'Herripon

[11] Patent Number: 5,013,283
[45] Date of Patent: May 7, 1991

[54] ADJUSTABLE PULLEY WITH IMPROVED SUPPORT STRUCTURE

[75] Inventor: Bastiaan A. d'Herripon, Tilburg, Netherlands

[73] Assignee: Van Doorne's Transmissie B.V., Tilburg, Netherlands

[21] Appl. No.: 491,913

[22] Filed: Mar. 12, 1990

[30] Foreign Application Priority Data

Mar. 20, 1989 [NL] Netherlands .............. 8900674

[51] Int. Cl.⁵ .............................................. F16H 55/56
[52] U.S. Cl. .......................................... 474/8; 474/12; 474/28
[58] Field of Search .................. 474/8, 11–14, 17, 24, 28–30, 42–45, 83, 101, 106–108, 112; 384/100, 107, 111–114, 118, 121

[56] References Cited

U.S. PATENT DOCUMENTS

| | | |
|---|---|---|
| 3,085,446 | 4/1963 | Erickson . |
| 3,117,461 | 1/1964 | Fermier .................. 474/43 X |
| 3,393,572 | 7/1968 | Larsson ..................... 474/17 |
| 3,400,600 | 9/1968 | Ruprecht et al. . |
| 3,504,560 | 4/1970 | Wunsch .................. 474/17 X |
| 3,636,785 | 1/1972 | Weindler et al. ............... 474/43 |
| 3,757,594 | 9/1973 | Kumm . |
| 3,771,377 | 11/1973 | Bush ........................ 474/17 |
| 4,143,558 | 3/1979 | van Deursen et al. . |
| 4,259,874 | 4/1981 | Guirriec ..................... 474/28 |
| 4,350,491 | 9/1982 | Steuer ....................... 474/12 |
| 4,575,364 | 3/1986 | Lamers ...................... 474/16 |
| 4,596,536 | 6/1986 | Okawa et al. ................. 474/8 |
| 4,617,004 | 10/1986 | Mott ......................... 474/8 |
| 4,619,587 | 10/1986 | Linnig ...................... 417/319 |
| 4,628,746 | 12/1986 | van Rooij ................. 73/862.34 |
| 4,838,835 | 6/1989 | Takano et al. .............. 474/13 |
| 4,869,705 | 9/1989 | Fenton ...................... 474/8 |

FOREIGN PATENT DOCUMENTS 347388 6/1960 Fed. Rep. of Germany .
907405 10/1962 United Kingdom .

Primary Examiner—Thuy M. Bui
Attorney, Agent, or Firm—Pennie & Edmonds

[57] ABSTRACT

In a continuously variable transmission with a pulley having discs (1, 2) wherebetween a driving belt (12) runs, at least one of the discs is movable for influencing the transmission ratio of the transmission. The moveable disc (1; 2) being mounted on a shaft (3), by support members (5; 7; 16, 18; 20, 21) possibly formed eccentrically relative to the shaft (3).

The support members take up the forces exerted by the driving belt (12) close to the point of application of the forces, so that in particular the movable pulley disc may be constructed less rigid, with a smaller mass and at a reduced cost price.

25 Claims, 6 Drawing Sheets

ADJUSTABLE PULLEY WITH IMPROVED SUPPORT STRUCTURE

BACKGROUND OF THE INVENTION

The invention relates to a pulley having at least two discs which are provided on a pulley shaft and which are fixed against relative rotation, and wherein at least one of the discs is axially movable with respect to the shaft.

Such a pulley is known from European Patent Application No. 84200759.3 and is often used in a continuously variable transmission, wherein a driving belt is provided between a pair of pulleys. By means of frictional contact between the side faces of the driving belt on the one hand and the contact faces of the pulleys on the other hand, to which end the side faces of the driving belt are usually conical and the discs of the pulley enclose a V-shaped gap for accommodating the driving belt therein, power can be transferred from the one shaft to the other shaft. The transmission ratio of the continuously variable transmission can be varied by changing the effective gap width of the two pulleys, which width is adjustable by axial movement of the axially movable disc.

The known pulley works satisfactorily but nevertheless has a number of drawbacks. The known pulley is rigid in order to be able to take up the forces exerted on said pulley under all circumstances. This makes the pulley relatively costly, heavy and complicated, and besides its mass inertia is large, which is not conducive to the efficiency and the dynamic behaviour of the pulley in particular and of the continuously variable transmission in general.

SUMMARY OF THE INVENTION

An object of the invention is to overcome said drawbacks. The pulley of the kind mentioned in the preamble is according to the invention characterized in that for at least one of the discs the pulley comprises a support radially outward of the shaft. Because of this measure the forces exerted on the discs are taken up and transmitted closer to the point of application, as a result of which an undesired build-up of forces in the construction is prevented and the pulley and accordingly the shaft may be less rigid, which results in an improved efficiency and dynamic behaviour, as well as in a reduced cost price and/or a simplified construction.

According to a further elaboration of the invention the radially outward support is also provided eccentrically with respect to the pulley shaft. The driving belt only makes contact with the discs of the pulleys along a certain segment of a circle, causing an eccentric load of the discs and resulting in an asymmetric deformation of the discs, an unbalanced contact pressure on the driving belt and a reduced transmission efficiency. By providing said support eccentrically outwardly of the shaft, as proposed, all this can be overcome in an optimal manner.

According to a further elaboration of the invention the radially outward support is provided with means for the transmission of forces towards a medium not being the pulley shaft. Because of this measure the forces exerted on the discs are no longer transmitted by the pulley shaft but by another medium, e.g. the housing of a continuously variable transmission, whose construction is already rigid by nature. The pulley shaft may be less rigid and less complicated in that case, which benefits the efficiency, the mass inertia of the pulley as well as the cost price of the pulley.

BRIEF DESCRIPTION OF THE DRAWING

The invention will be further explained with reference to a drawing and a few embodiments of the invention. In the drawing.

DESCRIPTION OF THE PREFERRED EMBODIMENTS

Figure 1A:
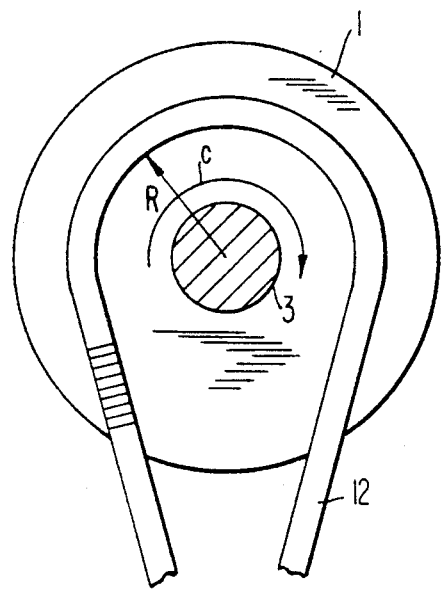
FIG. 1a, b shows a diagrammatic elevational view of a driving belt on a pulley according to prior art.

FIG. 1 diagrammatically illustrates a driving belt 12 applied on a known pulley having pulley discs 1, 2. The pulley disc 1 is fixed to the pulley shaft 3. The pulley disc 2 is fixed against rotation relative to shaft 3, but is axially moveable on the pulley shaft 3. Both pulley discs 1, 2 are directly supported by the shaft 3, therefore, said shaft 3 must directly support all forces exerted on the pulley discs. The pulley disc 2 is provided, in an otherwise known manner, with a cylinder wall 4 in which there is present a piston 6 mounted on the shaft 3, thus forming a cylinder-piston assembly. By changing the pressure in or the delivery flow through the cylinder chamber 30 in a known manner the axial position of the pulley disc 2 with respect to the pulley shaft 3 can be adjusted. The driving belt 12 is located at a distance R from the center of the pulley shaft 3. Said distance R is dependent on the momentaneous transmission ratio of e.g. a continuously variable transmission in which the pulley-driving belt assembly is provided. It is obvious, however, that the driving belt is constantly located radially outwardly of the pulley shaft 3. This means that when the pulley is only supported by the shaft 3, e.g. in this case by means of the ball tracks 40, which are costly and complicated because of the required accuracy, a substantial bending/twisting torque is transmitted by the driving belt, to the shaft via the pulley due to force F. The pulley and the shaft must be able to take up said bending/twisting torque and accordingly are designed rigidly. As a result the pulley shaft/pulley assembly is relatively complicated and costly, and represents a large mass inertia, which is not conducive to the dynamic behaviour.

FIG. 1 furthermore shows that the driving belt has only contact with the pulley along a segment of a circle C, as a result of which an eccentric load is applied to the pulley, the pulley discs 1, 2 are asymmetrically deformed and the driving belt is pressed down on the pulley discs in an unbalanced manner.

Figure 2:
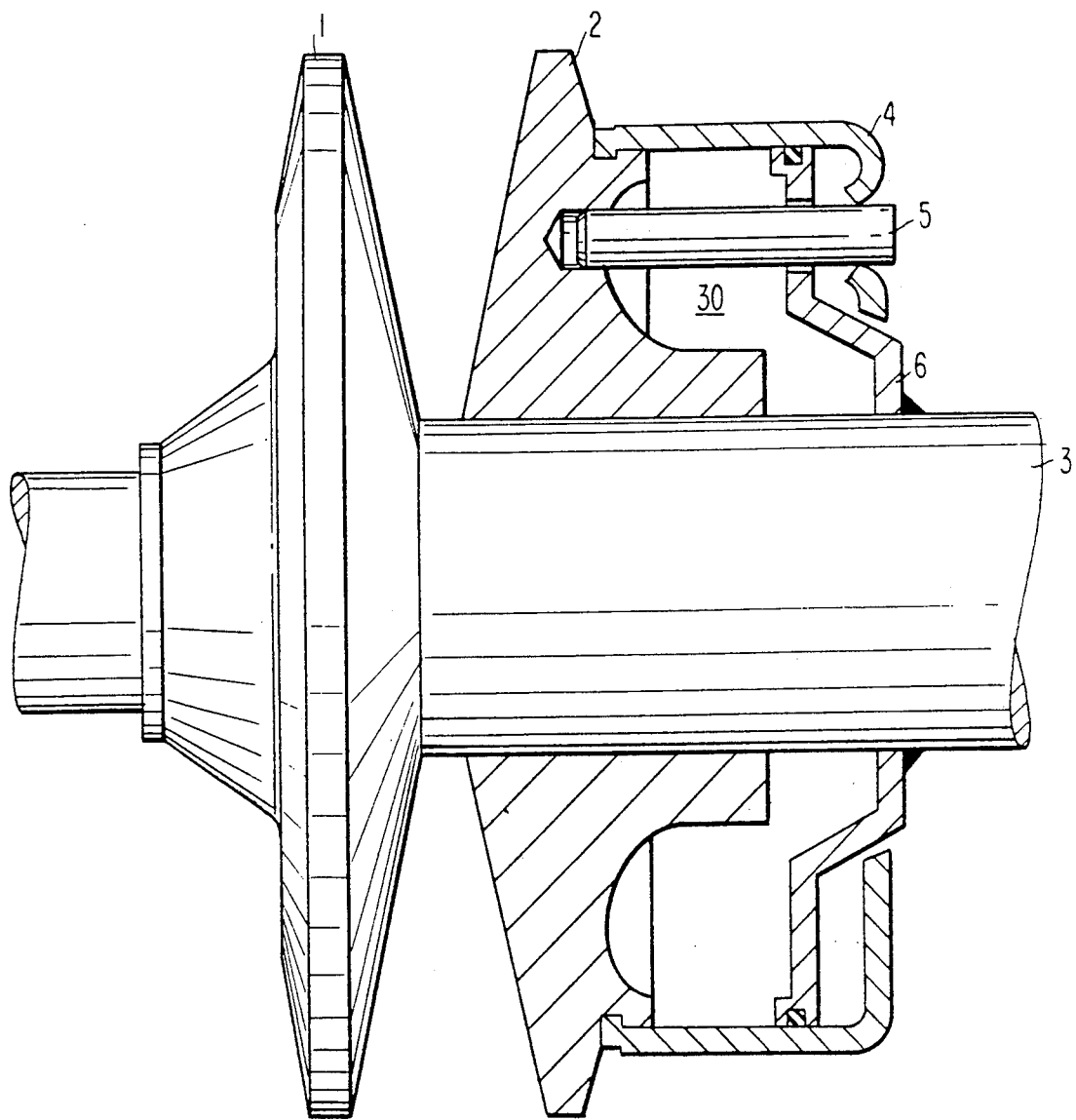
FIG. 2 shows a diagrammatic elevational view of an embodiment provided with a mortise/tenon construction.

According to a first embodiment of the invention, as illustrated in FIG. 2, the movable pulley disc 2 is also provided with a pin 5, provided radially outwardly of the pulley shaft 3 and axially parallel thereto, which pin 5 is mounted in a radially inwardly bent edge of the cylinder 4. Said pin 5 extends through and is supported by the piston 6 mounted on the shaft 3. Because of this measure the pulley disc 2 is supported radially outwardly of the pulley shaft, as a result of which the pulley disc 2 is supported more optimally and may be less rigid, therefore. Furthermore there is a reduction in the forces exerted on the shaft 3, as a result of which also the shaft may be less rigid and less strict requirements are made of the transition between the pulley disc 2 and the pulley shaft 3, and the costly and complicated supports, such as the ball track supports, may be left out, and in general less strict requirements are made of the accuracy. The radially inwardly bent edge of the cylinder 4 may be bent over onto the shaft 3 to completely seal said shaft, thus forming a second cylinder chamber, so that a cylinder chamber is present on both sides of the piston 6. The pulley movement can thus take place in two directions.

Figure 3:
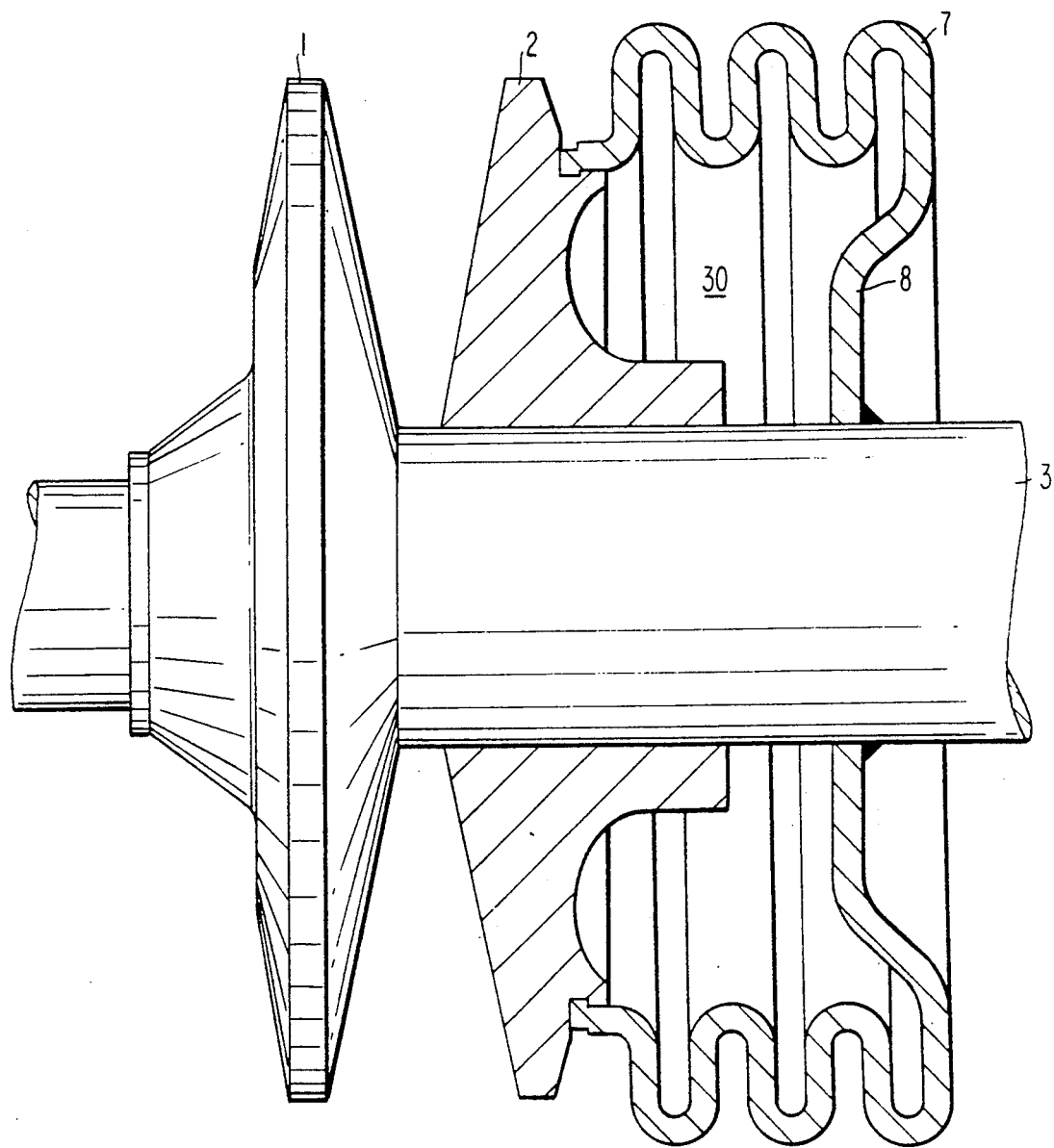
FIG. 3 shows a diagrammatic elevational view of a second embodiment provided with a bellows construction.

FIG. 3 shows a second embodiment of the invention, wherein the pulley disc 2 is provided with a bellows construction 7 provided radially outwardly of the shaft and extending parallel thereto. Said bellows construction 7 is provided with a radially inward part 8 which is fixed to the shaft 3. Also in this manner it is ensured that there is a radially outward support of the pulley, closer to the point at which the driving belt 12 makes contact. The bellows construction may thereby effect an axial movement of the pulley disc 2, by a certain deformation as a result of an increase or a reduction of the pressure or the delivery in the cylinder chamber 30, thus changing the adjustment of the transmission ratio. Said bellows construction 7 is moreover very advantageous, since it combines two functions which are normally carried out separately, viz. fixation of the pulley disc against relative rotation with respect to the shaft 3, and axial guiding.

Figure 4:
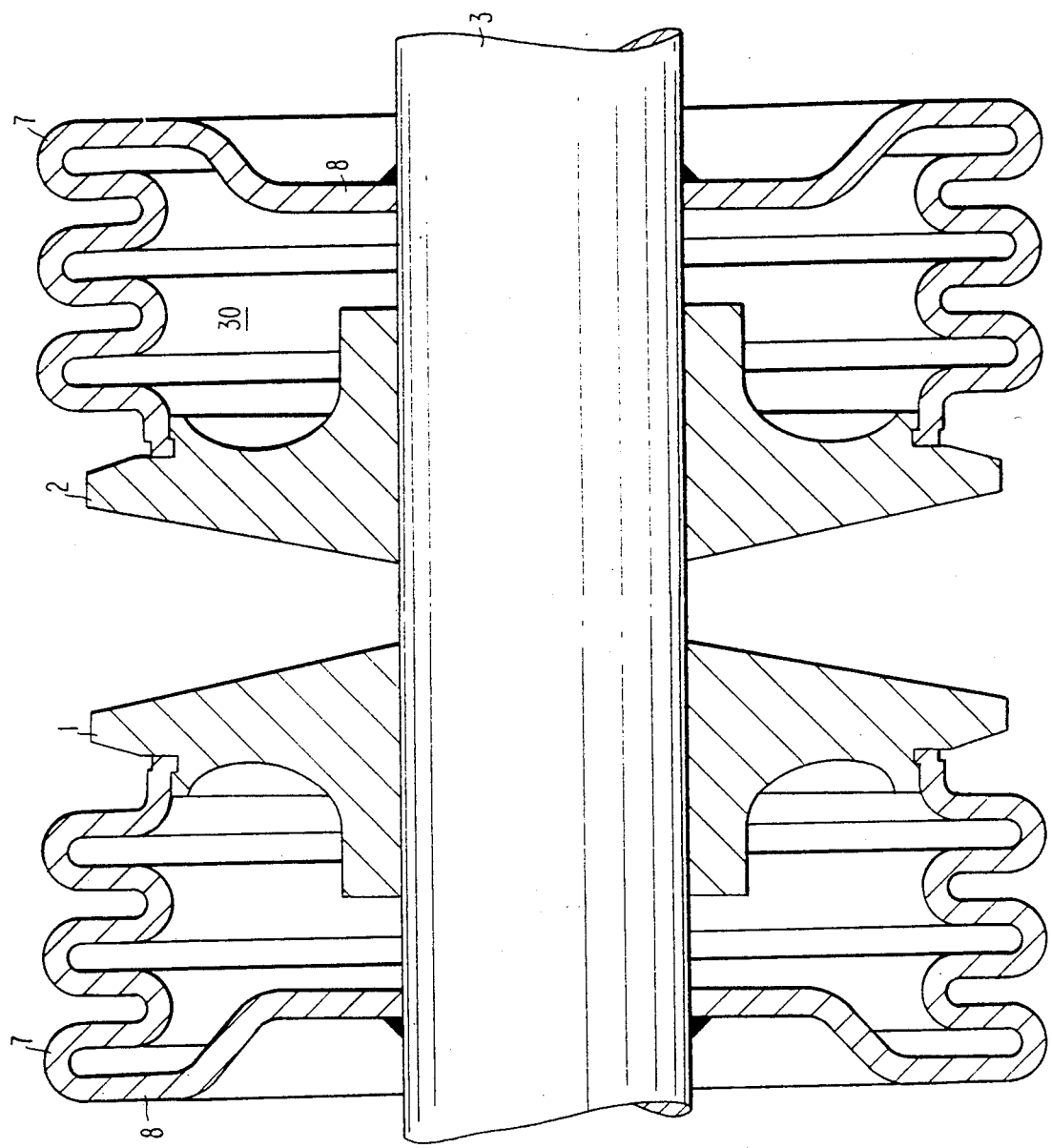
FIG. 4 shows a diagrammatic elevational view of a third embodiment provided with a double bellows construction.

FIG. 4 illustrates a corresponding bellows construction 7, 8, in this embodiment both pulley discs 1, 2 are provided with such a bellows construction, however. In this framework it is noted that according to the invention in general, but also for other embodiments in which only one pulley disc is provided with means and/or measures according to the invention, one of the two pulley discs as well as both pulley discs may be provided with means and/or measures according to the invention. In case both pulley halves or pulley discs are provided axially movably an optimum alignment (the error in alignment equals 0) of the belt can be ensured at all times, which is beneficial to the life of the belt.

Figure 5A:
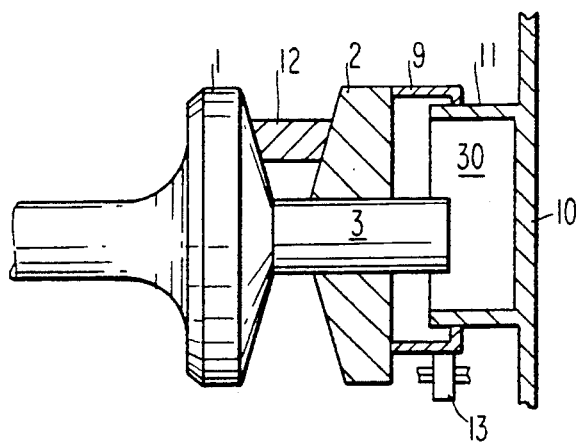
FIGS. 5a, b show a diagrammatic elevational view of a fourth embodiment provided with a pair of eccentric cylinders with transmission to the shaft (b) and the transmission housing (a) respectively.
Figure 5B:
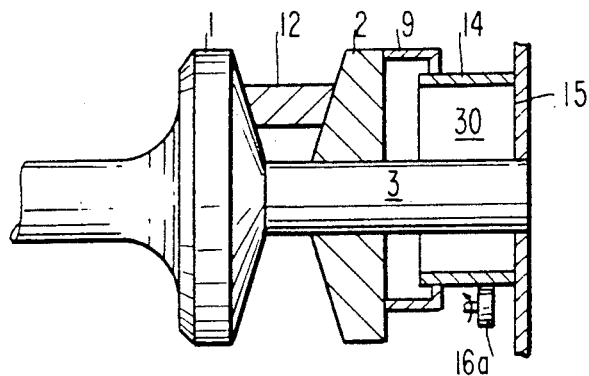

The pulley disc 2 of the embodiment according to FIG. 5a is provided with a cylinder 9. Said cylinder 9 is provided eccentrically with respect to the pulley shaft 3 and is kept in said eccentric position by a supporting roller 13 in this case. A supporting roller 13 is otherwise not absolutely necessary in this case. The transition of the cylinder 9 to the pulley disc 2 is such that a relative radial movement of the pulley disc 2 with respect to the cylinder 9 is possible. At the other side the cylinder 9 joins up with a cylinder 11 which is mounted on an external medium 10, e.g. a transmission housing. Said cylinder 11 is also provided eccentrically with respect to the pulley shaft 3. The cylinders 9, 11 and the external medium 10 on the one hand ensure a radially outward support of the pulley disc 2, but they also provide an eccentric support. As a result the force exerted on the pulley disc 2 by the driving belt is taken up by the support quite near the point at which the force is applied, viz. radially outwardly of the shaft and in particular, as a result of the eccentric position of the support, along the segment of a circle where the driving belt 12 actually makes contact with the pulley disc 2. As a result the pulley disc may be considerably less rigid. Because the radially outward support eventually transmits the forces to an external medium 10, such as a transmission housing, only part of which is shown, the pulley shaft 3 may be correspondingly less rigid. Alternately the force may be transmitted to the shaft without any problem, as is illustrated in FIG. 5b. Also in this case the shaft 3 may be less rigid than the shafts according to prior art, since the forces exerted on the pulley are taken up radially outwardly. To this end the embodiment of FIG. 5b comprises a cylinder 14, corresponding with the cylinder 11, which in this case joins up with a radially projecting closing plate 15 secured to the shaft 3. The transition from the cylinder 14 to the closing plate 15 is such that a relative radial movement of the closing plate 15 with respect to the cylinder 14 is possible. The cylinder 14 is thereby maintained in a radially eccentric position with respect to the shaft 3 by a supporting roller 16a which is not necessary per se.

Figure 6:
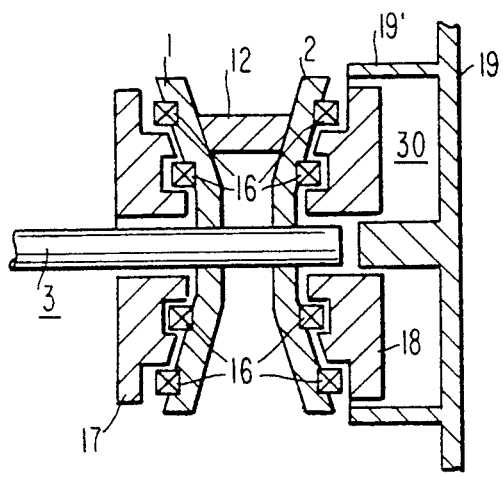
FIG. 6 shows a diagrammatic elevational view of a fifth embodiment provided with a bearing support.

In the embodiment of FIG. 6 bearing supports 17 and 18 respectively are provided near the two pulley discs 1, 2, whereby bearings 16 are provided between the bearing support 17, 18 and the pulley discs 1 and 2 respectively, which bearings 16 support the pulley discs radially outwardly. The bearing support 17 may thereby be fixed with respect to the transmission housing, e.g. in a manner not shown. The bearing support 18 is axially movably accommodated, as a piston unit, in a cylinder 19', which in its turn may be connected with e.g. a part 19 of the transmission housing or another external medium, so that the forces need not be taken up by the pulley shaft 3. Said part 19 of the transmission housing, the cylinder 19' and the bearing support 18 thereby enclose a cylinder chamber 30, in which the pressure or the delivery flow can be varied, so that the axial position of the bearing support 18, as well as the pulley disc 2 and the transmission ratio of the continuously variable transmission are adjustable.

Figure 7A:
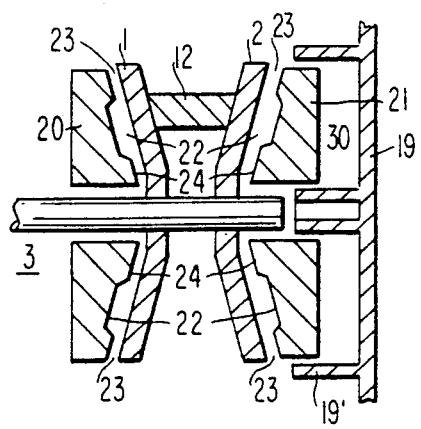
FIG. 7 shows a diagrammatic elevational view of a sixth embodiment of the invention provided with a fluid support with one (a) or more (c-d) non-eccentrically or (b) eccentrically loaded compartments.
Figure 7B:
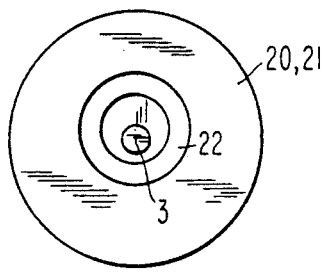

FIG. 7a illustrates an embodiment wherein fluid limiters 20, 21 are provided adjacent to the two pulley discs 12, said fluid limiters 20, 21 having compartments 22 in which a fluid, such as e.g. oil or air can be introduced. Said fluid will move out of the compartment radially inwardly and outwardly via the gaps 23 and 24 respectively, whereby a pressure is built up between the fluid limiter 20, 21 and the pulley discs 1 and 2 respectively, and the pulley discs 1 and 2 respectively are radially outwardly hydrostatically supported. The fluid limiter 21 is in its turn axially movable in a cylinder 19' mounted on the transmission housing 19, enclosing a cylinder chamber 30.

Said hydrostatic support may moreover eccentrically act on the pulley in an advantageous manner, in order to compensate for the likewise eccentric load by the driving belt 12, by providing the compartment 22 eccentrically in the fluid limiter 20, 21. Said fluid limiter will thereby be fixed against rotation.

Figure 7C:
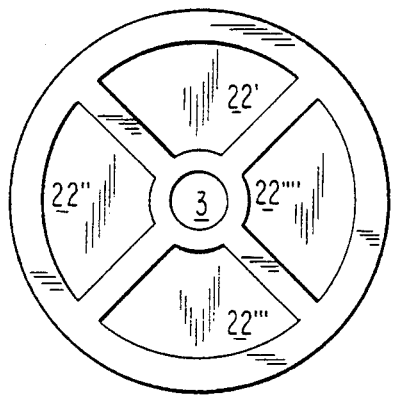
Figure 7D:
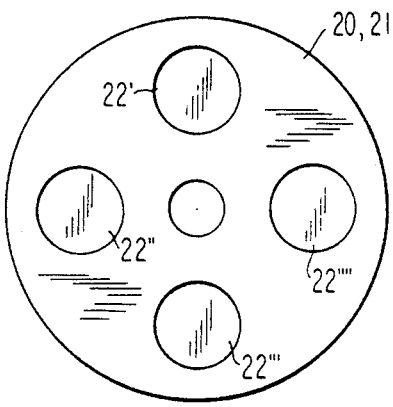

Instead of the single annular compartment 22 also more compartments may be provided, e.g. the compartments 22'-22''' according to the FIGS. 7c and 7d. In order to build up an eccentric hydrostatic bearing thereby the compartments can be put under different pressures, e.g. by varying the pre-resistance in the fluid supply to the compartments, and/or by varying the leakage gaps 23, 24 of the various compartments.

Figure 8A:
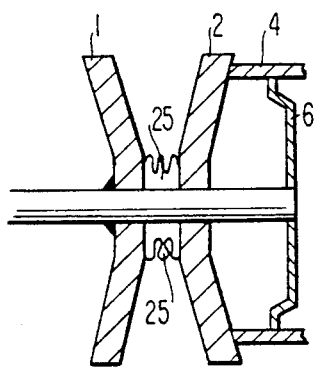
FIG. 8 shows a diagrammatic elevational view of embodiments provided with a bellows construction (a), leaf springs (b) and cross springs (c) respectively.
Figure 8B:
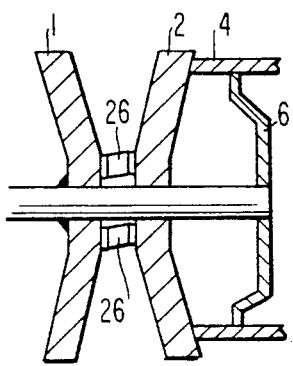
Figure 8C:
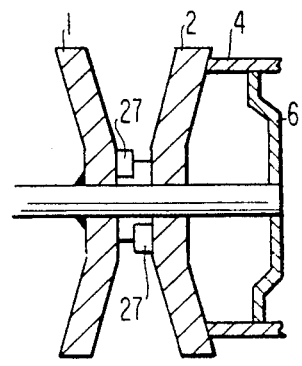

The FIGS. 8a-c show pulleys whose pulley discs 1 and 2 are mutually connected by means of one or more bellow constructions 25, one or more leaf springs 26, or one or more cross springs 27 respectively. As a result the pulley disc 2 is fixed, via the pulley disc 1 with the pulley shaft 3, against relative rotation with respect to the pulley shaft 3, but it may be axially moved, in an otherwise known manner, by means of the piston/cylinder unit 4-6, along the pulley shaft 3, thus adjusting the desired transmission ratio.

Figure 1B:
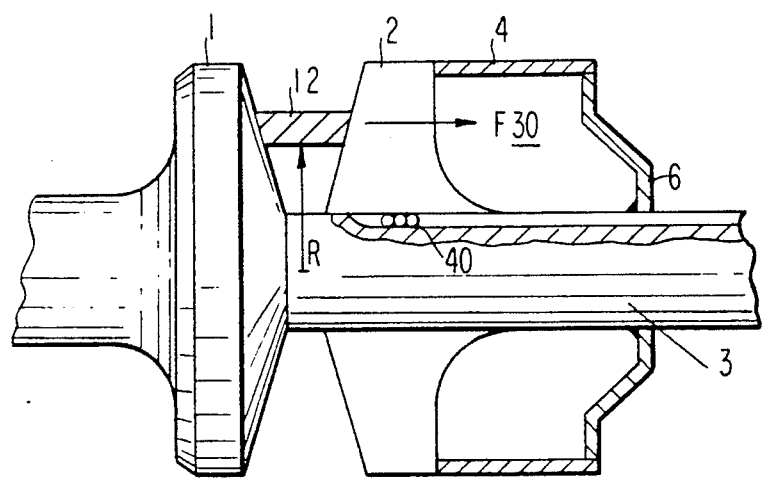

It will be apparent that the invention is not limited to the embodiments illustrated in the drawings, and that several variants are possible within the framework of the invention, which are considered to fall within the scope of the invention. Thus the pulley according to prior art, as illustrated in FIG. 1b, may e.g. be adapted to the standards of the invention by providing teeth on the circumference of the radial end of the piston unit 6, which extend into slots to be provided in the interior of the cylinder 4. As a result of this adaptation according to the invention the piston/cylinder assembly will serve as a power-connected, radially outward support of the pulley.

I claim:

1. An adjustable pulley, comprising:
   a pulley shaft;
   two discs disposed on said pulley shaft, said discs fixed against rotation relative to said shaft with one of said discs being axially movable on said shaft, and wherein said axially movable disc is supported radially outward from said shaft, said support being provided eccentrically with respect to said pulley shaft.

2. The adjustable pulley according to claim 1, wherein said radially outward eccentric support is provided with means for transmitting forces to a support not being pulley shaft.

3. The adjustable pulley according to 2, wherein said support is a transmission housing.

4. The adjustable pulley according to claim 1, wherein said discs of the pulley are mutually connected by means of cross springs.

5. The adjustable pulley according to claim 1, wherein said discs of the pulley are mutually connected by means of leaf springs.

6. The adjustable pulley according to claim 1, wherein both said discs are radially outwardly supported.

7. The adjustable pulley according to claim 1, wherein said discs of the pulley are mutually connected by means of a bellow structure.

8. An adjustable pulley, comprising:
   a pulley shaft;
   two discs disposed on said pulley shaft, said discs fixed against rotation relative to said shaft with one of said discs being axially movable on said shaft, and wherein said axially movable disc is supported radially outward from said shaft;
   a cylinder structure fixed to said axially movable disc defining a cylinder chamber;
   a piston member fixed on said shaft and disposed in said cylinder chamber; and
   a pin member extending from said axially movable disc in a direction opposite from said other disc and extending slidably through said piston member, said pin being disposed radially outward of said shaft in parallel thereto thus providing said radially outward support.

9. An adjustable pulley, comprising:
   a pulley shaft;
   two discs disposed on said pulley shaft, said discs fixed against rotation relative to said shaft with one of said discs being axially movable on said shaft and wherein said axially movable disc is supported radially outward from said shaft, wherein said radially outward support is provided by a bellows construction extending parallel to the shaft.

10. The adjustable pulley according to claim 9, wherein said bellows construction includes radially extending means for fixing the bellows construction to the pulley shaft.

11. The adjustable pulley according to claim 9, wherein said bellows constructions is connected with an associated transmission housing.

12. The adjustable pulley according to claim 9, wherein both said discs are axially movable on said shaft and supported radially outward, each by one of said bellows constructions.

13. An adjustable pulley, comprising:
    a pulley shaft;
    two discs disposed on said pulley shaft, said discs fixed against rotation relative to said shaft with one of said discs being axially movable on said shaft and wherein said axially movable disc is supported radially outward from said shaft, and
    a cylinder assembly comprising a first cylinder member closed on a first end by slidable engagement with said axially movable disc said first cylinder member communicating with and overlapping a second cylinder member on a second end, said first and second cylinder members being radially fixed relative to each other and defining a cylinder chamber, whereby a change of pressure in said cylinder chamber provides axial movement of said axially movable disc.

14. The adjustable pulley according to claim 13, wherein said first and second cylinder members are disposed eccentrically with respect to the pulley shaft.

15. The adjustable pulley according to claim 13, wherein said second cylinder member is closed by a radially extending member connected to said pulley shaft, said radially extending member slidably engaging said second cylinder member opposite said first cylinder member.

16. The adjustable pulley according to claim 13, wherein said second cylinder member is closed by fixing to an associated transmission housing opposite said first cylinder member.

17. An adjustable pulley, comprising:
    a pulley shaft;
    two discs disposed on said pulley shaft, said discs fixed against rotation relative to said shaft with one of said discs being axially movable on said shaft and wherein said axially movable disc is supported radially outward from said shaft by at least one fluid bearing provided as a fluid limiter, whereby fluid is provided between said discs and said fluid limiter.

18. The adjustable pulley according to claim 17, wherein said fluid limiter comprises at least one compartment.

19. The adjustable pulley according to claim 18, wherein different fluid pressures can be adjusted in said at least one compartment to compensate for any eccentric load applied to the disc by the driving belt by creating a corresponding eccentric pressure reaction force.

20. The adjustable pulley according to claim 17, wherein said fluid limiter is provided eccentrically with respect to the pulley shaft.

21. The adjustable pulley according to claim 17, wherein said fluid limiter is a piston unit which is axially movable in a cylinder unit.

22. The adjustable pulley according to claim 21, wherein said cylinder unit is connected with an associated transmission housing.

23. The adjustable pulley according to claim 21, wherein said cylinder unit is connected with the pulley shaft.

24. An adjustable pulley, comprising:
a pulley shaft;
two discs disposed on said pulley shaft, said discs fixed against rotation relative to said shaft with one of said discs being axially movable on said shaft and wherein said axially movable disc is supported radially outward from said shaft;
a cylinder structure fixed relative to said discs and defining a cylinder chamber;
a piston member disposed in said cylinder chamber; and
at least one bearing disposed on said piston member providing said radial outward support of said axially movable disc, whereby the axial position of said bearing supporting said axially movable disc may be varied by changing pressure in said cylinder chamber.

25. A continuously variable transmission comprising at least one adjustable pulley according to any of claims 1, 8, 9, 13, 24 or 17.

* * * * *